United States Patent [19]

Andersen et al.

[11] Patent Number: 4,888,194

[45] Date of Patent: Dec. 19, 1989

[54] SHELF-STABLE ASEPTIC DAIRY PRODUCT

[75] Inventors: Delmar L. Andersen, Baldwinsville; David J. Keller, Syracuse; Paul J. Streiff, Camillus, all of N.Y.

[73] Assignee: Borden, Inc., Columbus, Ohio

[21] Appl. No.: 207,912

[22] Filed: Jun. 13, 1988

Related U.S. Application Data

[63] Continuation of Ser. No. 940,095, Dec. 10, 1986, abandoned.

[51] Int. Cl.$^4$ ............................................. A23C 13/14
[52] U.S. Cl. ............................. 426/570; 426/580/613
[58] Field of Search .............. 426/564, 569, 570, 580, 426/586, 588, 613, 583, 572, 804, 98, 99, 103

[56] References Cited

U.S. PATENT DOCUMENTS

| | | | |
|---|---|---|---|
| 2,137,916 | 11/1938 | Kleerup | 426/570 |
| 4,175,141 | 11/1979 | Adam, Jr. et al. | 426/522 |
| 4,208,444 | 6/1980 | Gilmore et al. | 426/570 |
| 4,251,560 | 2/1981 | Dell et al. | 426/570 |

OTHER PUBLICATIONS

Joint FAO/WHO Food Standards Programme, 20th Session Report, Apr. 26–30, 1982, p. 2.

Id, pp. 30 and 31.
Grade A Pasteurized Milk Ordinance (PMO) PUB. 229, 1978 Recommendations, U.S. Dept. H.E. & W., Public Health SVC/FDA, U.S. Govt., Printing Office Stock #017-001-00419-7, pp. 20, 21 and 67 respectively.

Primary Examiner—Marianne Cintins
Attorney, Agent, or Firm—Robbins & Laramie

[57] ABSTRACT

A shelf-stable aseptic dairy product and process for preparing the same are disclosed. The product comprises dairy ingredients, an added monoglyceride emulsifier, sodium alginate stabilizer and other optional ingredients. The process comprises (a) heating dairy ingredients to above about 60° C.; (b) combining heated dairy ingredients, added emulsifier, sodium alginate stabilizer, and other optional ingredients; (c) performing an ultra-high temperature treatment; (d) cooling; (e) homogenizing to produce a stable and uniform emulsion; and (f) further cooling and packaging the resulting cooled emulsion in an aseptic container under aseptic conditions. A shelf-stable aseptic packaged product prepared according to the disclosed process is also disclosed. The product is shelf-stable for several months and is capable of forming a stable foam upon whipping.

22 Claims, No Drawings

SHELF-STABLE ASEPTIC DAIRY PRODUCT

This application is a continuation of application Ser. No. 940,095, filed Dec. 10, 1986, now abandoned.

BACKGROUND OF THE INVENTION

1. Field of the Invention

The present invention relates to a shelf-stable aseptic dairy product which is capable of forming a stable foam upon whipping and to a process for preparing the same. The dairy product is shelf-stable for up to several months.

2. Background

For many years there has been an interest in the production of shelf-stable dairy products. Fluid dairy products can be preserved for short periods of time by refrigeration, but nonetheless deteriorate fairly rapidly due to microbiological activity. Pasteurization slows down such deterioration somewhat but does not prevent it.

While refrigerated dairy products have the advantage of fresh taste, several disadvantages exist. In addition to the inconvenience to the consumer of having to obtain fresh dairy products on a frequent basis, fresh dairy products incur costs to the distributor which translate into an increased price for the consumer; for example, the products must be distributed and marketed under cooled conditions, and dairy products which have sat on the shelf for more than a few days become unfit for consumption and must be returned to the distributor. Of particular interest, therefore, has been a dairy cream product having a long shelf life, inasmuch as dairy cream is a "Sunday product" which is typically used only on an infrequent basis.

Within the past thirty years, aseptic packaging systems have been developed to provide commercially feasible packaging of sterile dairy products intended for long term storage without refrigeration. These systems make use of ultra-high temperature (UHT) treatment. UHT treatment produces a product that is free of spoilage organisms by heating the fluid dairy product to a temperature that is high enough to kill spore-forming organisms, for a sufficiently short period of time so as to minimize the physical and chemical changes in the product itself. Common process parameters for UHT treatment are a temperature in the range of 140° C. to 150° C. for a time from 2 to 7 seconds. By utilizing the UHT treatment in conjunction with an aseptic filling system, packaged fluid dairy products can be produced that remain fresh at ambient temperature for extended periods. The techniques and equipment that are required for UHT processing and for aseptic filling are well known in the art.

While UHT processing significantly increases shelf life of dairy products, several disadvantages may result from high temperature treatment. For example, UHT-treated dairy products tend to exhibit some flavor defects and fat emulsion instability on standing. It is theorized that this instability, which manifests itself as fat separation among other thins, is most likely caused by a change in the physical relationship between the fat, casein, and denatured serum proteins in the dairy product because of the UHT processing. This problem would be expected to be particularly significant for high fat content dairy products such as whipping cream.

In order to overcome this instability, homogenization is required to obtain a uniform and stable cream emulsion. However, homogenization will reduce the whipping properties of a dairy product intended for use in making whipped cream and syneresis is often seen in the whipped foam during standing, as well as excessive gelation caused by fat clustering, especially if the product is refrigerated before use.

Yet another deficiency is that ultra-high temperature treated dairy creams often have poor whipping properties which cause the whipped foam to be too weak and to have poor stand-up, making it unsuitable for decoration purposes, such as in bakeries and restaurants.

In order to maintain a cream product in an instantly whippable form, monoglyceride emulsifiers have been added to cream products. For example, U.S. Pat. No. 4,375,485 to Van Gennip discloses the use of lactic acid esters of monoglycerides for this purpose. However, this patent requires first separating out butter fat and lactic acid from the cream in order to preserve a desirable taste quality.

It is therefore an object of the present invention to provide a whippable dairy product which has a long shelf life at room temperature.

It is a further object to provide a dairy product which is present as a stable emulsion and which, when whipped, forms a foam which has acceptable foaming properties and a uniform consistency.

It is a still further object of the invention to provide an economical process for preparing a whippable dairy product which has a long shelf life at room temperature, is present as a stable emulsion and which, when whipped, forms a foam which has acceptable foaming properties and a uniform consistency.

SUMMARY OF THE INVENTION

Accordingly, a shelf-stable aseptic dairy product is provided, which is capable of forming a stable foam upon whipping, having a fat content of about 30% to about 40% by weight, comprising (a) about 90% to about 99.5% by weight of dairy ingredients; (b) about 0.4% to about 1.0% by weight of an added monoglyceride emulsifier; (c) about 0.02% to about 0.08% by weight of a sodium alginate stabilizer; and (d) 0% to about 5% by weight of sugar.

Also provided is a process for preparing a shelf-stable aseptic dairy product, which is capable of forming a stable foam upon whipping, having a fat content of about 30% to about 40% by weight and which comprises dairy ingredients, an added emulsifier, a sodium alginate stabilizer and other optional ingredients, comprising the steps of (a) heating dairy ingredients to above about 60° C.; (b) combining the heated dairy ingredients, an added edible emulsifier, a sodium alginate stabilizer, and other optional ingredients to form a mixture; (c) performing an ultra-high temperature sterilization treatment on the mixture; (d) cooling; (e) homogenizing to produce a stable and uniform emulsion; and (f) further cooling and packaging the resulting cooled emulsion in an aseptic container under aseptic conditions.

Also provided is a shelf-stable aseptic packaged product prepared by filling an aseptic container with the emulsion prepared in the above process.

In preferred embodiments, the emulsifier is a lactylated monoglyceride and the stabilizer is a sodium alginate which is complexed with both protein and calcium.

In other preferred embodiments, the ultra-high temperature treatment is an indirect heating process, and is performed at an adequate temperature to provide commercial sterility, followed by cooling and homogenizing at a pressure of about 500 psi to about 4000 psi.

In another embodiment, an aseptic packaged product is prepared from the disclosed process. Preferably, the product is maintained at a cooled temperature of about 1° C. to about 12° C. for a period of about two months and subsequently stored at room temperature.

DETAILED DESCRIPTION OF THE INVENTION

In its broadest embodiment, the invention relates to a shelf-stable aseptic dairy product, which is capable of forming a stable foam upon whipping, having a fat content of about 30% to about 40% by weight, comprising (a) about 90% to about 99.5% by weight of dairy ingredients; (b) about 0.4% to about 1.0% by weight of an added monoglyceride emulsifier; (c) about 0.02% to about 0.08% by weight of a sodium alginate stabilizer; and (d) 0% to about 5% by weight of sugar. (Unless otherwise indicated, all percentages are by weight.)

The dairy ingredients component is defined as having a fat content of about 30% to about 40% by weight, and preferably about 32% to about 36% by weight. The fat content of the dairy ingredient is preferably supplied entirely as dairy butter fat. However, a portion or all of the butter fat may be replaced with an oil of vegetable origin. If such a replacement occurs, however, the product will not conform to the FDA's standards of identity for a whipping cream product and would have to be identified, for example, as a "whippable topping" rather than a whippable cream product.

The dairy ingredient component may comprise dairy cream alone or in combination with whole or skim milk or milk solids in any proportions such that the desired butter fat content results.

The first essential additive of the dairy product of the present invention is an added edible monoglyceride emulsifier. While homogenization of the cream (discussed infra) aids in maintaining an emulsion of butter fat in the cream, poor whippability is demonstrated at both low homogenization and high homogenization pressures (i.e., whipping time is unsatisfactorily long).

When a low homogenization pressure is used, the fat globules of the cream are relatively large, and it is difficult to incorporate air in the cream during whipping, as the fat globules during the mechanical treatment being to churn out. This results in low overrun. This tendency toward churning also causes the foam to become stiff and water to separate from the foam soon after whipping.

When a high homogenization pressure is used, the fat globules of the cream are small, and it is relatively easy to incorporate air, resulting in a high overrun. The agglomeration tendency of the fat globules, however, is reduced, and therefore the stable foam lamellae are not formed, resulting in a very light and soft foam that collapses and separates water soon after whipping.

It has been found that, by using an added emulsifier combined with a high homogenization pressure, these small fat globules become whippable. The cream (i.e. the dairy ingredient) remains stable in liquid form, but desirably destabilizes quickly during whipping to form a stable foam with a high overrun. The monoglycerides of the present invention induce this destabilization effect on the emulsion when treated mechanically.

It has further been found that, in the liquid cream, the added emulsifier together with the protein of the cream, forms a rigid film around the fat globules. This film ensures that the cream remains stable. By using mechanical energy (applied by whipping) the protective film is broken, which allows the fat globules to agglomerate. The air incorporated in the cream will remain trapped in a foam because a hard shell consisting of emulsifier and protein is formed between fat/air and fat/water phases during whipping. Using electron microscopy of the foam, the distinct fat globules can still be seen at air/water interphases.

The added emulsifier is a monoglyceride ester. The preferred esters are lactic acid esters of monoglycerides (i.e., lactylated monoglycerides) made from edible, refined, hydrogenated vegetable fat. The preferred esters comprise palmitic and stearic acids as the main fatty acids and are about 20% to 25% esterified. A most preferred emulsifier is Lactodan P22-K, available from Grindsted Products, Inc., Industrial Airport, Kansas 66031. Lactodan P22-K has a maximum iodine value of 0.2; a maximum acid value of 0.4; saponification value of 270–300; maximum free glycerol content of 1%; and melting point of approximately 45° C.

Another suitable emulsifier is Myvatex Texture Lite (available from Eastman Kodak, Rochester, New York). This product is an aerating cake emulsifier prepared from distilled propylene glycol, monoesters blended with distilled monoglycerides, and sodium stearoyl lactylate.

The commercially available products that are sold as monoglycerides typically contain, in addition to monoglycerides, some diglyceride, some triglyceride, some free fatty acid, and some free glycerol. Some commercially available monoglyceride emulsifiers contain a substantial amount of diglyceride. It is believed that substantially all of the commercially available products sold as monoglycerides, and mixtures of monoglycerides and diglycerides, are useful in the practice of the invention. It is preferred that they be esterified further with lactic acid so that they would generally be referred to in the trade as lactylated monoglycerides or possibly as lactylated diglycerides.

The added emulsifier is generally used in an amount of about 0.4% to about 1.0% by weight based on the weight of the composition. Preferably the emulsifier is used in an amount of about 0.5% to about 0.9%; most preferably, about 0.6% to about 0.8% of the added emulsifier is used.

If less than about 0.4% of the emulsifier is used, the destabilizing effect (discussed supra) which allows for whippability is not satisfactory. Furthermore, at emulsifier levels below this amount, undesirably high viscosity results after UHT treatment and homogenization. If more than about 1.0% of the emulsifier is used, unsatisfactory off-flavors in the product are noted.

The second essential additive to the dairy ingredients of the present invention is a sodium alginate stabilizer. The stabilizer is a milk soluble sodium alginate product. Preferably, the stabilizer is a sodium alginate which is complexed with both protein and calcium.

By adding sodium alginate to the dairy ingredients, a complex consisting of calcium, protein and alginate is formed, which stabilizes the protein, preventing water separation in the dairy ingredient. The presence of calcium alone turns the sodium alginate into a gel. The sodium alginate is therefore best incorporated in the dairy ingredient at a high temperature, (i.e., above 60° C.) since at a high temperature calcium cannot form a bond with alginate as it is preferentially bound to the protein. During cooling, the alginate becomes complexed with both protein and calcium. If, however, alginate is added to the unheated dairy ingredients, part of it will not go onto the protein, but rather make a gel with the free calcium ions present. When the dairy ingredient is homogenized at a high pressure, these calcium alginate lumps are not visible, but an increased dosage of sodium alginate will then be needed to replace calcium-bound alginate to prevent syneresis.

One preferred stabilizer is a milk soluble sodium alginate sold under the mark Marloid CMS, by Kelco, a division of Merck & Co., Inc., Clark, New Jersey 07066. Marloid CMS is a milk-soluble sodium alginate product designed for use in ultra-high temperature pasteurization systems. Marloid CMS comprises algin, tetrabasic sodium pyrophosphate, and sugar, and is available as a fine, granular powder having a solids content of 90+5%: a particle size of at least 80% through 40 mesh, U.S. Standard Sieve size (381 microns), viscosity of 40 to 175 cP (2% solution) (as measured by Brookfield Viscometer) and a pH of 9.7 to 10.4.

Another satisfactory edible additive is a stabilizer/emulsifier system which is a proprietary product sold by Dari-Tech Industries of Atlanta, Georgia, as UHT whipping cream stabilizer. Its suggested usage level with whipping cream is 0.25% by weight, or 21 pounds per 1,000 gallons of cream. It contains algin, mono and diglycerides, and dextrose. If this system is used, a separate emulsifier is not necessary.

Another preferred stabilizer is Sobalg FD 155, available from Grindsted Products, Inc., Industrial Airport, Kansas 66031.

The stabilizer is generally present in an amount of about 0.02% to about 0.08% by weight based on the weight of the composition. Preferably about 0.03% to about 0.07% of the stabilizer is used; most preferably, about 0.04% to about 0.06% is used. The amount of stabilizer needed is a function of homogenization pressure (i.e., higher levels of stabilizers are necessary at higher pressures).

Optionally, sugar may be incorporated into the composition to provide sweetness to the product. 0% to about 5% by weight of sugar may be used. Preferably, about 0% to about 2% by weight of sugar is added; most preferably, about 0.1% is used.

Additionally, artificial flavors may be incorporated into the product. Suitable flavors include fatty acids, ketones, lactones, alcohols, esters, essential oils, and other natural and artificial flavors dissolved in a suitable solvent such as propylene glycol. A preferred commercially available flavoring is Artificial Flavor #2388, available from Grinsted Products, Inc., supra. When used, the artificial flavor is present as about 0.005% to about 0.05% of the composition, preferably about 0.01% to about 0.03% of the composition, and most preferably about 0.02% of the composition.

Furthermore, standard dairy additives such as preservatives, stabilizers, emulsifiers, nutritive ad non-nutritive sweeteners, minerals, vitamins and fiber may be optionally added to the composition of the present invention. Such additives include sodium phosphate, lecithin, polysorbate 80, sodium citrate, carrageenan, calcium salts, vitamins A and D, carboxymethyl-cellulose, aspartame, saccharin, sorbitol, hydrogenated starch hydrolysate, corn syrups, fructose, dextrose, and sugar.

The process of the present invention in its broadest embodiment comprises the following steps: (a) heating dairy ingredients to above about 60° C.; (b) combining heated dairy ingredients, an added edible emulsifier, a sodium alginate stabilizer, and other optional ingredients; (c) performing an ultra-high temperature sterilization treatment; (d) cooling; (e) homogenizing to produce a stable and uniform emulsion; and (f) further cooling and packaging the resulting cooled emulsion in an aseptic container.

Before undertaking these process steps, the dairy cream may optionally be pasteurized, clarified and standardized to the desired butter fat content, according to any method commonly used in the art. When the dairy ingredients comprise a combination of pasteurized cream and milk, the milk portion must be pasteurized, clarified and standardized as well. When a combination of solids and/or milk and cream is used, the milk and cream may be blended in any large scale mixing vessel, e.g., a Lanco mixer, then pumped to a batch tank.

Before addition of any additives, the dairy ingredients are heated, preferably while mixing, to above about 60° C., and preferably above about 65° C., most preferably about 68° C. to about 72° C.

The emulsifier, stabilizer and optional ingredients are dry blended in the required proportions and added to the heated dairy ingredients in the mixer. Preferably, the additives are added in the following manner: a portion of the cream (approximately 15% or more) is heated with mixing, exercising care not to overmix and cause fat churning. The emulsifier/stabilizer/optional ingredients mix is slowly added into the vortex of the mix and heating is continued, i.e., at about 70° C. to about 75° C. The mixture is held at 70° C. with agitation for at least ten minutes to ensure that the dry blend of additives is completely dissolved. The mixture is then added to the remaining portion of the cream in a batch tank. Optional flavoring additives or other additives may be added to the batch tank at this time with thorough mixing. If the mixture is not to be further processed immediately, it is cooled to about 4° C. to about 5° C.

The mixture is next subjected to ultra-high temperature treatment in accordance with conventional ultra-high temperature (UHT) treatment processes. Two different types of UHT processing are in common usage. These are commonly referred to in the industry as the indirect process and the direct process.

In the indirect sterilization process, the cream or other liquid dairy ingredients are passed through a heat exchanger, generally a heat exchanger of the tubular or plate types. During this heat exchange process, dairy ingredients are generally passed through a tubular coil that is maintained in a very hot environment, often through the use of superheated steam.

In the direct sterilization process, steam is injected directly into the cream or other fluid dairy ingredients to heat it rapidly with maximum efficiency of heat exchange. For a description of one direct sterilization process and the equipment used, see U.S. Pat. No. 3,230,095, the disclosure of which is incorporated herein by reference. Since the injected steam condenses directly in the dairy ingredients, the condensation of the steam dilutes the ingredient with from 10% to 12% by weight of added water. This water must be removed prior to sale. Removal of the water is generally accomplished by vacuum evaporation.

Preferably, the UHT treatment is by an indirect sterilization process. The UHT treatment occurs at an adequate temperature to provide commercial sterility, i.e., about 137° C. to about 149° C.

Following UHT treatment, the mixture is cooled and passed to an homogenization apparatus. The mixture is cooled such that homogenization may be performed at about 49° C. to about 82° C., preferably about 52° C. to about 72° C. Most preferably, homogenization is performed at about 60° C. to about 65° C.

The homogenization pressure is high, i.e., about 500 psi to 4000 psi, and preferably about 1600 psi to about 3000 psi. At high pressures, the cream remains stable in liquid form but rapidly destabilizes during whipping to form a stable foam with a high overrun. Most preferably, the homogenization pressure is about 2000 psi to about 3000 psi.

The resulting dairy ingredient emulsion is then cooled to a temperature below about 27° C. and preferably below about 16° C. The emulsion product is then packaged in aseptic containers in accordance with any method known in the art. A preferred method for packaging aseptic dairy products is disclosed in U.S. application Ser. No. 807,450, filed Dec. 10, 1985, assigned to the assignee of the present invention and herein incorporated by reference. The specification of this application discloses a process for the aseptic packaging of liquid dairy products wherein a selected gas such as nitrogen is injected into the liquid, and the resulting liquid-gas mixture is filled into a container under aseptic conditions. The fill volume of the mixture is such as to leave no free space in the container when it is closed. However, upon standing, separation of the liquid-gas mixture occurs, creating a nitrogen-filled headspace.

For optional preservation of shelf life, the aseptically packaged dairy product of this invention is first "aged" at a temperature below room temperature, e.g., about 1° C. to about 12° C. Preferably the product is aged at about 5° C. or below for a period of about 20 days to 3 months, and preferably about two months. The aging process is believed to produce a controlled crystallization of glycerides in the fat globules. After this initial aging procedure, the dairy product is shelf-stable at a temperature below about 22° C. for up to about 9 months.

Immediately prior to use, the dairy product may be whipped to produce a foamed whipped cream. The product should be refrigerated (e.g., to 4° C.) prior to whipping.

EXAMPLE I

Dairy cream having a butter fat content of 32% was provided. Approximately 15% of the dairy cream (based on the final mixture) was heated to 70° C. 0.6% (by weight based on the finished product) of a lactylated monoglyceride (Grinsted Lactodan P22-K) and 0.05% (by weight, based on the weight of finished product) of a sodium alginate (Kelco Marloid CMS) were dry blended and added to the heated cream. Once the dry blend was fully dissolved in the heated cream, the mixture was added to the remaining dairy cream and ultra-high temperatures treated by indirect processing at 144° C. for four seconds, cooled to 60° C., and homogenized downstream at a pressure of 150 kg/cm$^2$ (2150 psi). After homogenization, the cream mixture was cooled to a temperature below 27° C. and aseptically filled in sterile containers. The cream mixture was aged at 5° C. for 24 hours to obtain complete crystallization of the triglycerides in the fat globules. The aged cream was whipped for about 1.25 minutes at maximum speed using a Sunbeam Mixmaster. No separation (syneresis) was observed after allowing the foam to stand three hours at room temperature.

EXAMPLES II AND III

The process of Example I was substantially repeated except that 0.45% (Example II) and 0.80% (Example III) of the lactylated monoglyceride emulsifier was used. Following whipping, the product was refrigerated. In both cases, an acceptable product was obtained.

EXAMPLES IV AND V

The process of Example I was again substantially repeated except that homogenization was performed at 1800 psi (Example IV) and homogenized in two steps at 2500 and 200 psi (Example V). In both cases, an acceptable product was obtained.

EXAMPLE VI

A mixture of dairy cream (40.3% butter fat) and milk (3.5% butter fat) was provided in appropriate proportions such that the mixture had a butter fat content of 32%. About 25% of the cream was heated to 158° F. 0.6% (by weight based on the finished product) of Lactodan P$_{22}$-K emulsifier was added. 0.05% Marloid CMS and 0.10 sugar (all by weight based n weight of the final product) were dry blended and added to the heated mixture. After complete dissolution, the mixture was added back to the remaining dairy mixture and ultra-high temperature treated by indirect processing at about 143 to 146° C. for five seconds and homogenized at a pressure of 2100 psi at about 74° C. After homogenization, the mixture was cooled to a temperature below 10° C. and filled into sterile containers. The cream was aged at 5° C. for 24 hours. After 3 minutes of whipping, a product having good flavor, weak to light whip body, and heavy fluid body was obtained.

EXAMPLE VII

The process of Example VI was substantially followed, except that 0.1% Marloid CMS and 0.3% Lactodan were used. After three minutes' whip time, a product having good flavor, medium fluid body and light to medium whip body resulted.

EXAMPLES VIII AND IX

The process of Example VI was substantially followed, except that 0.1% of Marloid CMS, 0.3% of Lactodan and 0.1% of sugar were used, and the mixture was homogenized at 1000 psi (Example VIII) and 2100 psi (Example IX), respectively. After 3.5 minutes and 3.0 minutes' whip time, respectively, a product with good flavor, medium fluid body and weak to light whip body was obtained.

EXAMPLE X

The process of Example VI was substantially followed, except that homogenization was performed at 500 psi. A product having good flavor, light whip body and fluid body was obtained.

EXAMPLE XI

The process of Example VI was again followed except that 1.0% Myvatex Texture Lite was substituted for the Lactodan emulsifier, the amount of Marloid was doubled and 0.3% polysorbate 80 was used. The product, after whipping for 2.5 minutes, had a good flavor, light to medium fluid body and medium whip body.

CONCLUSIONS

The present invention thus provides a shelf-stable aseptic dairy product which is capable of forming a stable foam upon whipping. Unlike prior art whipped cream products, the product of the present invention will not degrade due to bacterial growth or syneresis and possesses desirable whippability characteristics.

It has been discovered that, when an added edible emulsifier such as a lactylated monoglyceride is used, the fat globules present in the cream remain stable in liquid form but desirably destabilize quickly during whipping to form a stable foam with a high overrun. It is believed that, in the liquid cream, the added emulsifier, together with the protein in the cream, forms a rigid film around the fat globules, ensuring stability of the cream. Upon whipping this film is broken, allowing a stable, light foam to form as fat globules agglomerate.

It has further been discovered that, by adding a sodium alginate stabilizer, a complex consisting of calcium, protein and alginate is formed, which stabilizes the protein, preventing water separation in the dairy ingredient.

Therefore, by employing the requisite amounts of emulsifier, stabilizer, and optional sugar and other additives, and by processing in accordance with selected techniques, a whippable dairy product possessing the above desirable characteristics may be obtained.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A room temperature-stable aseptic dairy product which has been subjected to an ultra-high temperature sterilization treatment and which is capable of forming a stable foam upon whipping, having a fat content of about 30% to about 40% by weight, comprising:
   (a) about 90% to about 99.5% by weight of dairy ingredients;
   (b) about 0.4% to about 1.0% by weight of an added monoglyceride emulsifier;
   (c) about 0.02% to about 0.08% by weight of a sodium alginate stabilizer; and
   (d) 0% to about 5% by weight of sugar.

2. The dairy product of claim 1 wherein the added monoglyceride emulsifier is a lactylated monoglyceride, wherein the dairy ingredients comprise fat globules and protein, and wherein the added emulsifier together with the protein forms a rigid film around the globules.

3. The dairy product of claim 1 wherein the sodium alginate stabilizer is complexed with both protein and calcium.

4. The dairy product of claim 1, wherein the product comprises about 0.6% to about 0.8% by weight of the added monoglyceride emulsifier.

5. The dairy product of claim 1, wherein the product comprises about 0.4% to about 0.06% by weight of the sodium alginate stabilizer.

6. The dairy product of claim 1, wherein the product is shelf-stable below about 22° C. for up to about 9 months.

7. A process for preparing a room temperature-stable aseptic dairy product, which is capable of forming a stable foam upon whipping, having a fat content of about 30% to about 40% by weight and which comprises dairy ingredients, an added emulsifier and a sodium alginate stabilizer, comprising the steps of:
   (a) heating dairy ingredients to above about 60° C.;
   (b) combining said heated dairy ingredients, added edible emulsifier and a sodium alginate stabilizer, to form a mixture;
   (c) performing an ultra-high temperature sterilization treatment on said mixture;
   (d) cooling the mixture of step (c);
   (e) homogenizing said cooled mixture to produce a stable and uniform emulsion; and
   (f) further cooling to a temperature below about 27° C. and packaging the resulting emulsion in an aseptic container under aseptic conditions.

8. The process of claim 7 wherein said ultra-high temperature treatment (c) is performed at an adequate temperature to provide commercial sterility.

9. The process of claim 7 wherein said ultra-high temperature treatment (c) is an indirect process.

10. The process of claim 7 wherein said heating step (a) is performed at a temperature of about 68° C. to about 72° C.

11. The process of claim 7 wherein said homogenizing step (e) is performed at a pressure of about 500 psi to about 3000 psi.

12. The process of claim 7 wherein said homogenizing step (e) is performed at a pressure of about 2000 psi to about 4000 psi.

13. The process of claim 7 wherein said emulsifier is a lactylated monoglyceride.

14. The process of claim 7 wherein said sodium alginate stabilizer is complexed with both protein and calcium.

15. The process of claim 7 wherein the cooled emulsion of step (f) is maintained at a cooled temperature of about 1° C. to about 12° C. for a period of about two months and subsequently stored at up to 22° C.

16. A process of claim 7 wherein the emulsion of step (f) comprises a liquid-gas mixture.

17. A room temperature-stable aseptic packaged product prepared according to the process of claim 15.

18. A room temperature-stable aseptic dairy product which has been subjected to an ultra-high temperature sterilization treatment and that is capable of forming a stable whipped cream-like foam upon whipping, said product having a butterfat content in the range from about 30% to about 40% by weight, comprising:
   (a) from about 90% to about 99.5% by weight of dairy ingredients;
   (b) from about 0.6% to about 0.8% by weight of an added lactylated monoglyceride edible emulsifier;
   (c) from about 0.04% to about 0.06% by weight of a milk soluble sodium alginate stabilizer; and
   (d) 0% to about 5% by weight of sugar.

19. The product of claim 18 which, after storage at a temperature in the range of about 1° C. to about 12° C. for at least two months, is shelf-stable below about 22° C. for up to about 9 months.

20. A process for preparing a room temperature-stable dairy product in an aseptic package, that is capable of forming a whipped cream-like stable foam upon whipping, said product having a fat content of from about 30% to about 40% b weight and comprising dairy ingredients, an added edible emulsifier and an edible stabilizer, comprising the steps of:

(a) heating said dairy ingredients to a temperature in the range from about 68° C. to about 72° C.;

(b) combining said heated dairy ingredients, added edible emulsifier and sodium alginate stabilizer, to form a mixture;

(c) performing an ultra-high temperature sterilization treatment of said mixture;

(d) cooling said mixture of step (c);

(e) homogenizing said cooled mixture at a pressure in the range from about 500 psi to about 4000 psi, to produce a stable and uniform emulsion from said mixture; and (f) further cooling to a temperature below about 27° C. and packaging the resulting emulsion under aseptic conditions in a closable container for storage.

21. The process of claim 20 wherein said homogenizing step (e) is performed at a pressure in the range from about 2000 psi to about 4000 psi, and said added edible emulsifier is a lactylated monoglyceride.

22. A process of claim 20 wherein the emulsion of step (f) comprises a liquid-gas mixture.

* * * * *